(12) United States Patent
Barber

(10) Patent No.: US 7,520,981 B2
(45) Date of Patent: Apr. 21, 2009

(54) WATER DESALINATION

(75) Inventor: Christopher Barber, Darlington (AU)

(73) Assignee: Desaln8 Pty Ltd. (AU)

( * ) Notice: Subject to any disclaimer, the term of this patent is extended or adjusted under 35 U.S.C. 154(b) by 287 days.

(21) Appl. No.: 10/586,103

(22) PCT Filed: Jan. 17, 2005

(86) PCT No.: PCT/AU2005/000052

§ 371 (c)(1),
(2), (4) Date: Jul. 14, 2006

(87) PCT Pub. No.: WO2005/068371

PCT Pub. Date: Jul. 28, 2005

(65) Prior Publication Data

US 2007/0151915 A1 Jul. 5, 2007

(30) Foreign Application Priority Data

Jan. 15, 2004 (AU) .............................. 2004900164

(51) Int. Cl.
*E02B 15/00* (2006.01)
*C02F 9/00* (2006.01)
*C02F 63/00* (2006.01)
*B01D 61/00* (2006.01)

(52) U.S. Cl. .............................. 210/170.01; 210/195.2; 210/257.2; 210/232; 210/170.11

(58) Field of Classification Search ................. 210/652, 210/170.1, 170.2, 170.11, 195, 2, 257.2, 210/322, 170.01, 170.02
See application file for complete search history.

(56) References Cited

U.S. PATENT DOCUMENTS

| 2,451,168 | A | | 10/1948 | Lauman | ...................... 166/187 |
| 3,456,802 | A | * | 7/1969 | Cole | ..................... 210/170.11 |
| 4,125,463 | A | * | 11/1978 | Chenoweth | .................. 210/636 |
| 5,174,901 | A | | 12/1992 | Smith | .......................... 210/652 |
| 5,366,635 | A | * | 11/1994 | Watkins | ...................... 210/651 |
| 5,520,816 | A | | 5/1996 | Kuepper | ..................... 210/649 |

(Continued)

OTHER PUBLICATIONS

Australian Patent Office, International Search Report; Feb. 22, 2005.

(Continued)

*Primary Examiner*—Ana M Fortuna
(74) *Attorney, Agent, or Firm*—Winstead P.C.

(57) ABSTRACT

An in situ desalination apparatus comprising a reverse osmosis unit (15) having a reverse osmosis medium, the reverse osmosis unit in use to be located within a body of water under ambient bio-physico-chemical conditions often different from those at the surface, the unit having an inlet (17) opening to one side of the reverse osmosis medium, in use the inlet to be located below the upper surface of a body of water, the unit having a concentrate outlet (25) opening to the one side of the reverse osmosis medium and opening into the exterior of the unit at a position spaced below the inlet to return concentrate into the water body, the unit having a permeate outlet (27) opening to the other side of the reverse osmosis medium, the permeate outlet communicating with a delivery line extending from the body of water, a pump (23) between body of water and the reverse osmosis unit and adapted to pressurize the water located at the one side of the reverse osmosis medium.

20 Claims, 5 Drawing Sheets

U.S. PATENT DOCUMENTS

| | | | |
|---|---|---|---|
| 5,914,041 A | 6/1999 | Chancellor | 210/641 |
| 5,916,441 A * | 6/1999 | Raether | 210/257.2 |
| 6,139,750 A | 10/2000 | Graham | |
| 6,187,202 B1 * | 2/2001 | Fish | 210/652 |
| 6,348,148 B1 * | 2/2002 | Bosley | 210/170.11 |
| 6,905,604 B2 * | 6/2005 | Taber | 210/652 |
| 7,029,576 B2 * | 4/2006 | Siegfriedsen | 210/153 |
| 7,344,644 B2 * | 3/2008 | Haudenschild | 210/617 |
| 2003/0230535 A1 | 12/2003 | Affeld et al. | 210/652 |

OTHER PUBLICATIONS

Australian Patent Office; International Preliminary Report of Patentability.

* cited by examiner

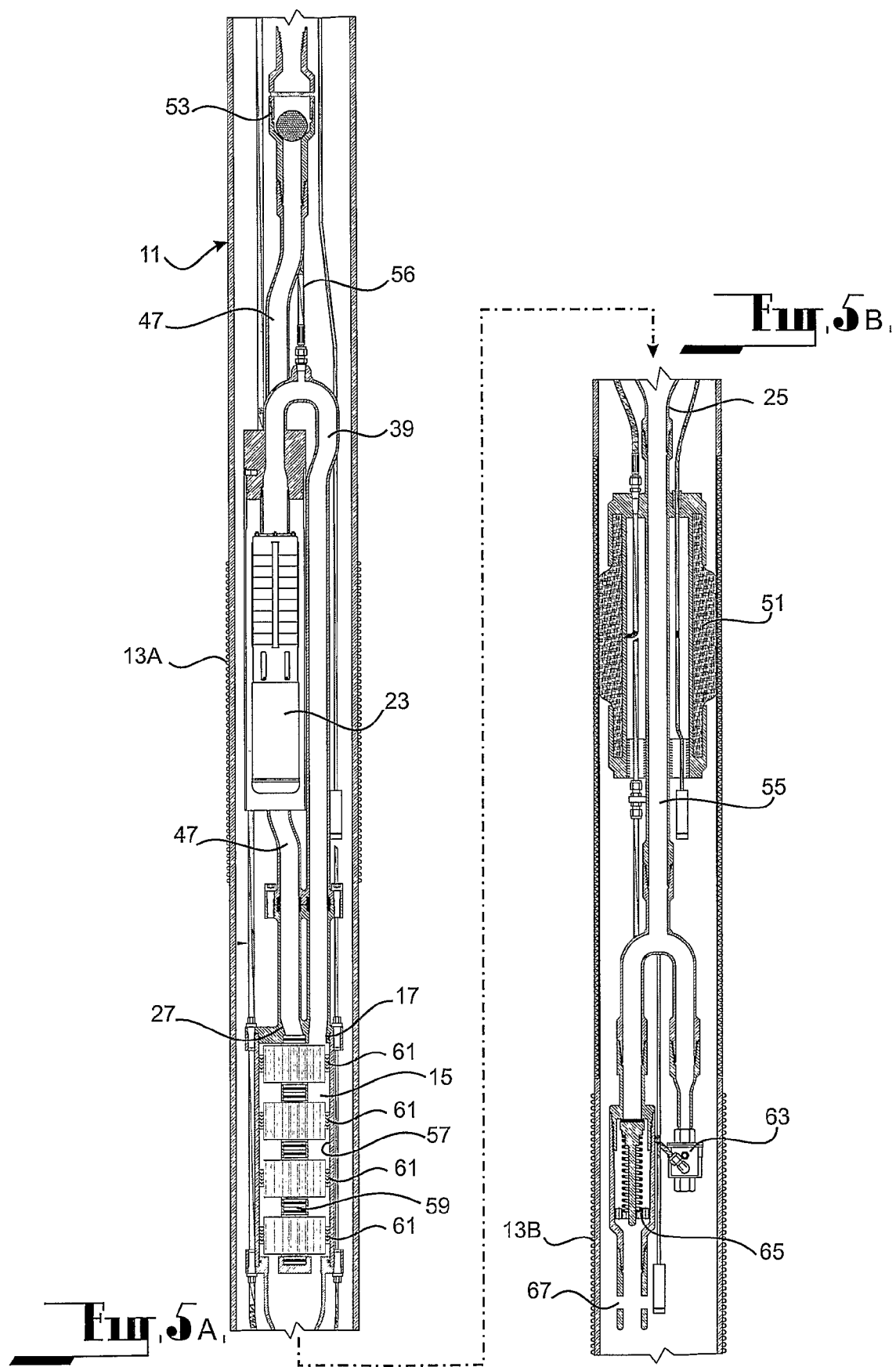

WATER DESALINATION

CROSS REFERENCE TO RELATED APPLICATIONS

This application is a 371 US National Phase of PCT/AU2005/000052 filed on 17 Jan. 2005, which claims priority to AU 2004900164 filed on 15 Jan. 2004.

FIELD OF THE INVENTION

The invention relates to desalination of brackish or saline water including seawater and groundwater by utilisation of a reverse osmosis process. The invention enables the in situ treatment of such water which can present significant advantages.

BACKGROUND ART

Osmotic pressure is produced when solutes in aqueous solution at one side of an osmotic reverse osmosis medium are at a chemical potential less than that in pure aqueous solvent (water) located on the other side of the reverse osmosis medium and as a result the solvent naturally permeates through the reverse osmosis medium into the aqueous solution to equalize the chemical potentials thereby exerting an osmotic pressure across the reverse osmosis medium.

In reverse osmosis, pressures greater than the osmotic pressure are exerted on the aqueous solution and this has the effect of inducing the solvent to permeate through the reverse osmosis medium from solution, while the solute is excluded from diffusion and remains behind in solution. Therefore the aqueous solution becomes more concentrated, and water with a low solute concentration accumulates on the other side of the reverse osmosis medium. By this process water can become "desalinated".

Reverse osmosis has become a much more feasible technology for the desalination of non-potable water supplies, and although still more expensive than conventional water extraction the technology is starting to be used in more remote regions, arid areas where there are few alternatives. Examples of the latter are the oil-rich Gulf states, arid regions in California and elsewhere in the US. In Australia, the Ayers Rock resort at Yulara relies on RO-treated groundwater. Additionally, Perth in WA is currently commissioning a large seawater desalination plant as a preferred option to address increased demand and reduced rainfall.

Desalination by reverse osmosis is energy-expensive generally, as more saline, non-potable water is pumped under pressure through a reverse osmosis medium separation chamber and aqueous solvent diffuses through the reverse osmosis medium whilst salts and contaminants are rejected by the reverse osmosis medium and concentrate in the feed stream. This gives rise to a saline waste which requires proper disposal.

In addition in existing reverse osmosis systems these require facilities for the above-ground storage of the water which is to be desalinated in the reverse osmosis device. This exposes the water to oxygen and sunlight which results in increased biological activity such as algal growth and physicochemical reactions such as iron oxidation and precipitation which can cause reverse osmosis medium clogging, thus water must be pretreated before desalination.

DISCLOSURE OF THE INVENTION

The invention enables the in situ treatment of brackish or saline water derived from groundwater aquifers, surface water and the sea including seawater and brackish groundwater by application of the reverse osmosis process within the body of water which can avoid some of the problems of existing systems. The in situ treatment of the water avoids any reactions that can arise from subjecting the water to the atmosphere, sunlight and like influences.

According to one aspect the invention resides in an in situ desalination apparatus comprising a reverse osmosis unit having a reverse osmosis medium, the reverse osmosis unit in use to be located within a body of water, the unit having an inlet opening to one side of the reverse osmosis medium, in use the inlet to be located below the upper surface of a body of water, the unit having a concentrate outlet opening to the one side of the reverse osmosis medium and opening into the exterior of the housing at a position spaced below the inlet, the unit having a permeate outlet opening to the other side of the reverse osmosis medium, the permeate outlet communicating with a delivery line extending from the body of water, a pump between body of water and the reverse osmosis unit and adapted to pressurise the water located at the one side of the reverse osmosis medium.

According to a preferred feature of the invention the body of water comprises a body of surface water which can comprise a lake, river, ocean, estuary or like body of water.

According to a preferred feature of the invention the body of water comprises an underground aquifer and the upper surface comprises the water table and/or piezometric surface of the reservoir.

According to a preferred feature of the invention the reverse osmosis unit is adapted to be located within a bore hole extending into the aquifer.

According to a preferred feature of the invention the reverse osmosis unit comprises a second set of reverse osmosis units connected in series downstream from the first set of reverse osmosis units, the concentrate outlet of the second reverse osmosis units being subjected to the hydrostatic pressure representative of the lower most position of the apparatus within the body of water which is less than the pressure applied to the one side of the reverse osmosis medium. According to a preferred feature of the invention of the first and second sets of reverse osmosis units comprise a set of reverse osmosis cells. According to a preferred feature of the invention the pump and second pump means comprise a common pump connected to the inlet and the permeate outlet through a set of valves whereby said common pump is able to introduce said water into the inlet and deliver permeate from the permeate outlet through a controlled activation of the valves.

According to a further aspect the invention resides in an in situ desalination apparatus comprising a length of tubular casing adapted in use to be located in a bore hole, two screened portions at axially spaced locations along the length of casing below the water level in the borehole, a sealing means between the screened portions within the casing and subdividing the interior of the casing into an upper portion and a lower portion, the sealing member located between the screened portions, the casing supporting a reverse osmosis unit having a reverse osmosis medium, the unit having an inlet providing communication between the upper portion and one side of the reverse osmosis medium, the unit having a concentrate outlet providing communication between the one side of the reverse osmosis medium and the lower portion of, the unit having a permeate outlet opening to the other side of the reverse osmosis medium, the permeate outlet communicating with a delivery line extending from the body of water, a pump adapted to deliver water under pressure from the upper portion to the inlet, whereby the pressure differential created across the reverse osmosis medium will facilitate reverse osmosis.

According to a preferred feature of the invention the concentrate outlet is controlled by an exhaust valve which will be closed upon the pressure at the one side of the reverse osmosis medium falling below a pressure of predetermined magnitude which shall be at least equal to the desired operating pressure at the lower end of the reverse osmosis unit According to a preferred feature of the invention the sealing means comprises an inflatable packer which can be selectively inflated to provide the sealing.

According to a preferred feature of the invention the housing, pump and sealing means comprise a unit which is removable from the length of casing.

According to a preferred feature of the invention the length of casing comprises a portion of a bore hole casing.

According to a preferred feature of the invention the length of casing is adapted to be located at the lower end of a bore hole casing.

According to another aspect the invention resides in an in situ desalination apparatus adapted to be located in a bore hole casing located in a bore hole, the casing having a screened portion at a position below the water level in the casing, the apparatus comprising a sealing means receivable within the casing and adapted in use to subdivide the interior of the casing in the region of the screened portion into an upper portion and a lower portion, the sealing member located between the screened portions, the apparatus further comprising a reverse osmosis unit having a reverse osmosis medium, the unit having an inlet providing communication between the upper portion of the interior of the casing and one side of the reverse osmosis medium, the unit having a concentrate outlet providing communication between the one side of the reverse osmosis medium and the lower portion of the interior of the casing, the unit having a permeate outlet opening to the other side of the reverse osmosis medium, the permeate outlet communicating with a delivery line extending from the body of water, the apparatus further comprising a pump adapted to deliver water under pressure from the upper portion of the interior of the casing to the inlet, whereby the pressure differential created across the reverse osmosis medium will facilitate reverse osmosis.

According to a preferred feature of the invention the screened portion comprises two screened portions at axially spaced locations along the length of casing.

According to a preferred feature of the invention the concentrate outlet is controlled by a exhaust valve which will be closed upon the pressure at the one side of the reverse osmosis medium falling below a pressure of predetermined magnitude which shall be at least equal to the desired operating pressure at the lower end of the reverse osmosis unit According to a preferred feature of the invention the sealing means comprises an inflatable packer which can be selectively inflated to provide the sealing. According to a preferred feature of the invention the sealing means comprises a sleeve which is receivable in the screened portion to provide two screened portions at axially spaced locations along the length of casing.

According to a preferred feature of the invention the housing, pump and sealing means comprise a unit which is removable from the length of casing.

According to a preferred feature of each of the above aspects of the invention the invention the permeate outlet is associated with a pumping means adapted to extract permeate passing through the reverse osmosis medium.

According to a preferred feature of each of the above aspects of the invention the permeate outlet is vented to the atmosphere.

According to a preferred feature of each of the above aspects of the invention the reverse osmosis unit comprises at least two first reverse osmosis units connected to the inlet in parallel.

The invention will be more fully understood in the light of the following description of several specific embodiments.

BRIEF DESCRIPTION OF THE DRAWINGS

The description is made with reference to the accompanying drawing of which;

FIGS. 5A and 5B are jointly a sectional side elevation of a third embodiment of the invention.

DETAILED DESCRIPTION OF THE SPECIFIC EMBODIMENTS

Each of the embodiments applies the concept of lower cost desalination using the process of conventional reverse osmosis, through the use of downhole technology where the source of water is brackish, saline or otherwise low quality groundwater. It is intended that the units according to the embodiments can be placed in a substantially conventional borehole without any substantial modification of the borehole although a dual screen design is preferred. The in situ units are engineered to naturally dissipate the wastewater products of reverse osmosis back into the aquifer, utilizing the density difference between the natural saline groundwater and the reverse osmosis effluent since within a borehole, the more dense and saline reverse osmosis effluent will move vertically downwardly through the aquifer under gravity by "fingering" through less dense groundwater and accumulating at the base of the aquifer.

The likely reverse osmosis well configuration is for a dual-screen well, with the topmost screen allowing saline groundwater ingress to the downhole reverse osmosis device, whilst the lower screen allows saline effluent to dissipate within the naturally saline aquifer. The two screens can be separated by an inflatable packer which is common in downhole operations.

Figure 1:
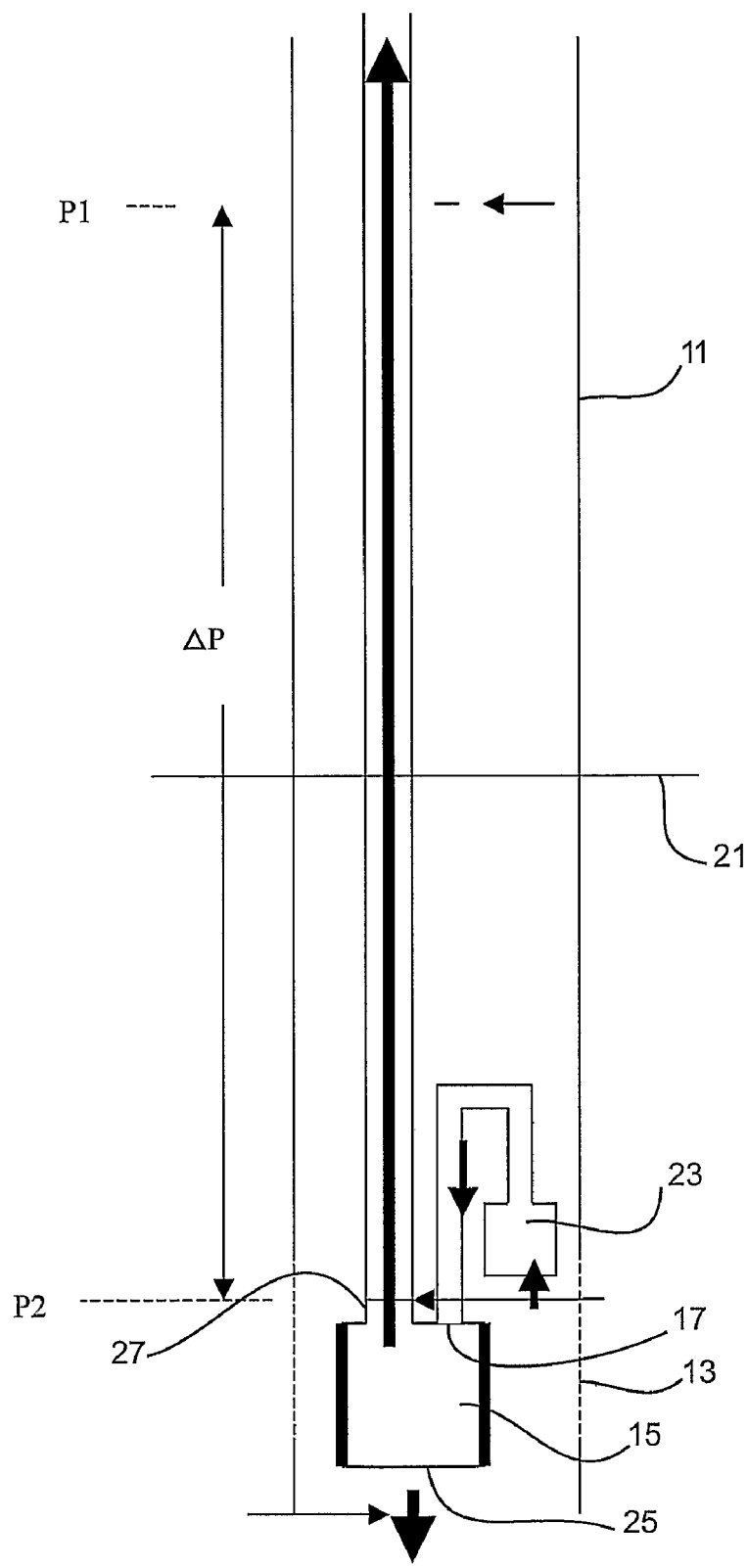
FIG. 1 is a schematic drawing illustrating the operation of each of the embodiments of the invention.

The principle of operation of the embodiments are illustrated schematically at FIG. 1 which illustrates a bore hole 11 having a screened portion 13 through which water can pass at its lower end. The bore hole accommodates a reverse osmosis unit 15 which has an inlet 17. In addition the inlet is associated with a pump 23 which delivers water from the aquifer to the inlet 17 to maintain the pressure at the inlet side of the reverse osmosis medium at the desired pressure for the medium. The reverse osmosis unit 15 is provided with a concentrate outlet 25 which is open to the one side of the reverse osmosis medium common to the inlet 17. The concentrate outlet 25 is lowermost such that the denser reverse osmosis concentrate from the reverse osmosis unit 15 is injected outward through the lower screen into deeper parts of the aquifer and if there is a density contrast between concentrate and ambient groundwater then this will tend to flow downwardly over time under the influence of gravity into lower parts of the aquifer. The reverse osmosis unit 15 is also provided with a permeate outlet 27 which opens to the other side of the reverse osmosis medium and is intended to receive the permeate flowing through the reverse osmosis medium. The permeate outlet can be associated with a further pump (not shown) which serves to extract the permeate from the permeate outlet. In addition the permeate outlet is vented to atmosphere.

The utilisation of the first pump 23 to deliver water from the aquifer to the inlet 17 enables the pressure at the inlet 17 to be above the inherent hydrostatic pressure surrounding the reverse osmosis unit provided by the water table level 21 and to control the magnitude of the pressure P1 applied to the one side of the reverse osmosis medium through the inlet 17. The magnitude of the pressure differential $\Delta P$ between the inlet and the pressure head of water P2 in the permeate outlet 27 will be determined largely by the delivery pressure of the pump. The low pressure on the permeate side of the reverse osmosis medium can be reduced by pumping of permeate to the surface.

The principle of each of the embodiments involves the in situ operation of the reverse osmosis unit whereby the water being delivered into the unit remains within the its own environment until after it has permeated through the reverse osmosis membrane.

Figure 2:
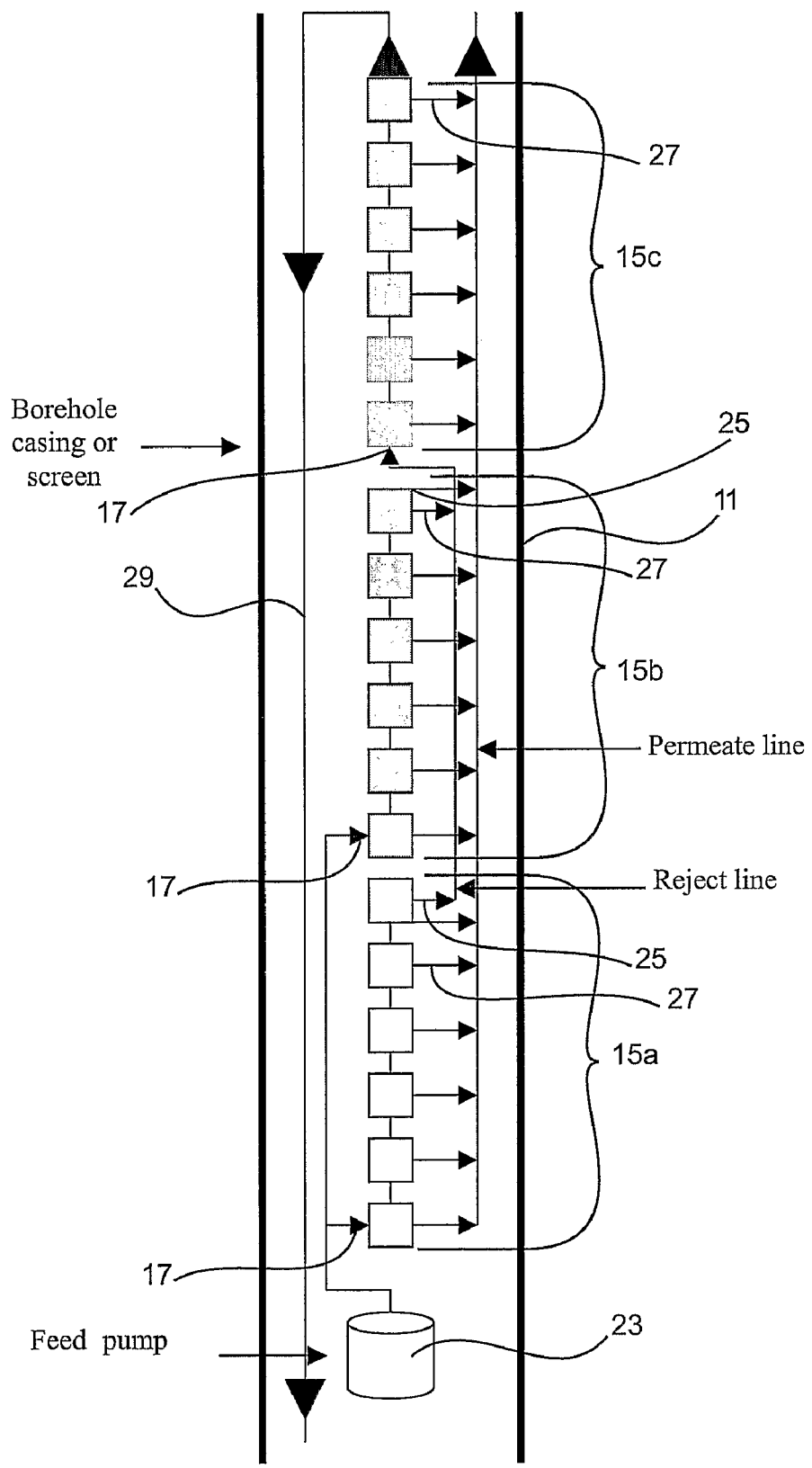
FIGS. 2 and 3 are a schematic representations of the first embodiment of the invention.
Figure 3:
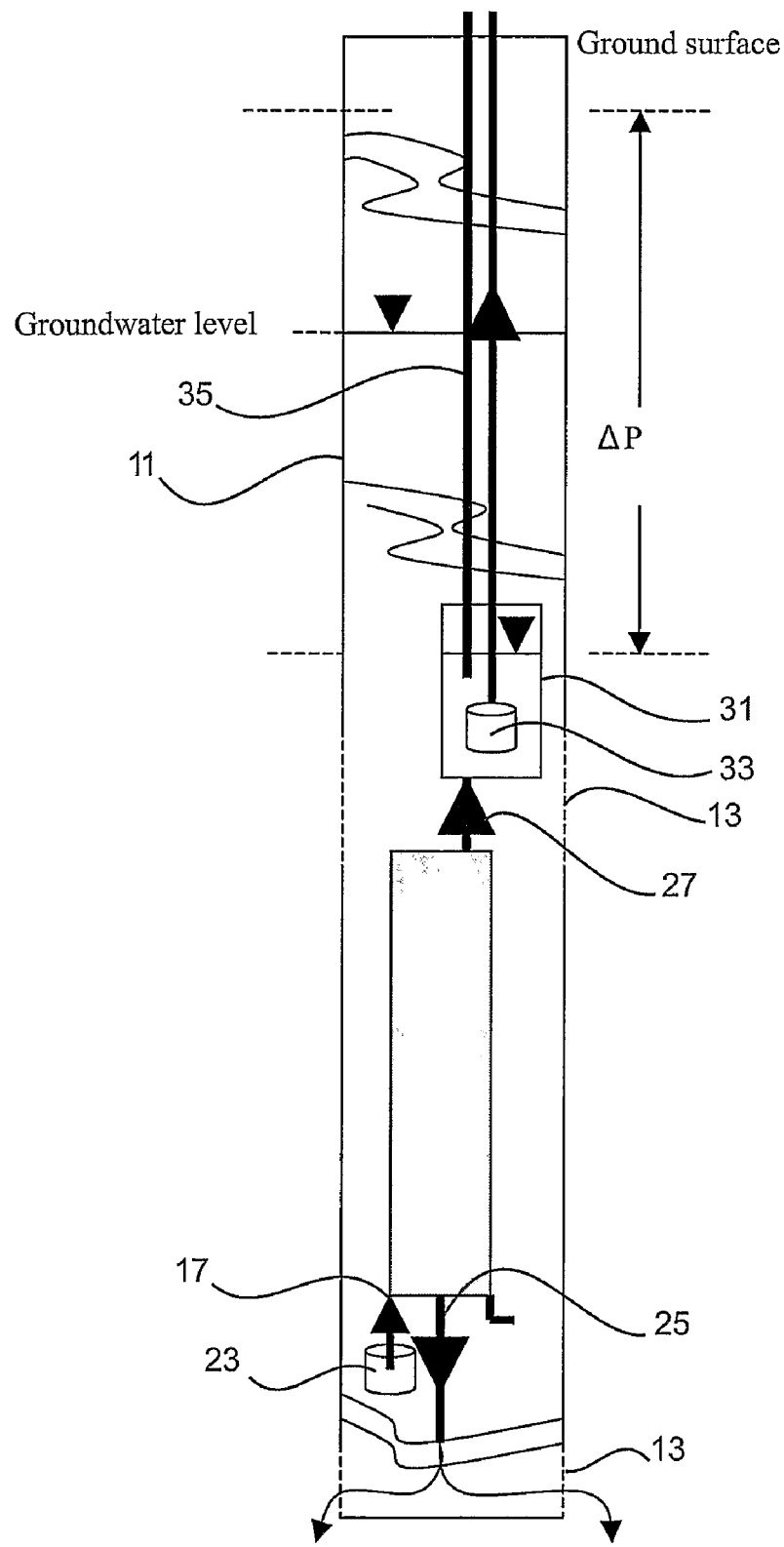

The first embodiment as illustrated at FIGS. 2 and 3 and comprises an arrangement (shown in FIG. 3) in which the inlet 17 of the reverse osmosis unit or array of units is provided with a feed pump 23 which will deliver the ground water to the inlet at a pressure greater than the inherent hydrostatic pressure at the inlet. The permeate is delivered into a storage reservoir 31 from the permeate outlet 27 and the storage reservoir is provided with a second pump 33 for extracting permeate from the storage reservoir. The storage reservoir is vented to atmosphere through a duct 35.

As shown in FIG. 2 the reverse osmosis unit 15 comprises three reverse osmosis units 15a, 15b and 15c which each comprise a set of reverse osmosis cells connected in series. The units are located longitudinally within the bore hole. The feed pump 23 delivers groundwater from the aquifer into the two lower most units 15a and 15b such that the first and second units are essentially connected in parallel in relation to the reservoir and feed pump. The inlet 17 for each unit is located lowermost and each cell of each unit has a permeate outlet 27 which delivers permeate to a common delivery line connected to a pump 9 (not shown). In addition the upper most cell of each unit is connected to the concentrate outlet 23 whereby reject effluent from the first and second units 15a and 15b are introduced into the inlet for the uppermost third unit 15c. In the third unit 15C each reverse osmosis cell has a permeate outlet which delivers permeate to the common delivery line. The uppermost reverse osmosis unit 15c is provided with a concentrate outlet which communicates via an outlet conduit into the lowermost end of the bore hole to deliver the concentrate into the borehole. The arrangement of the first embodiment as shown at FIGS. 2 and 3 is illustrative of just one possible configuration arranged for in situ reverse osmosis, and there many other such configurations which could be used.

Figure 4:
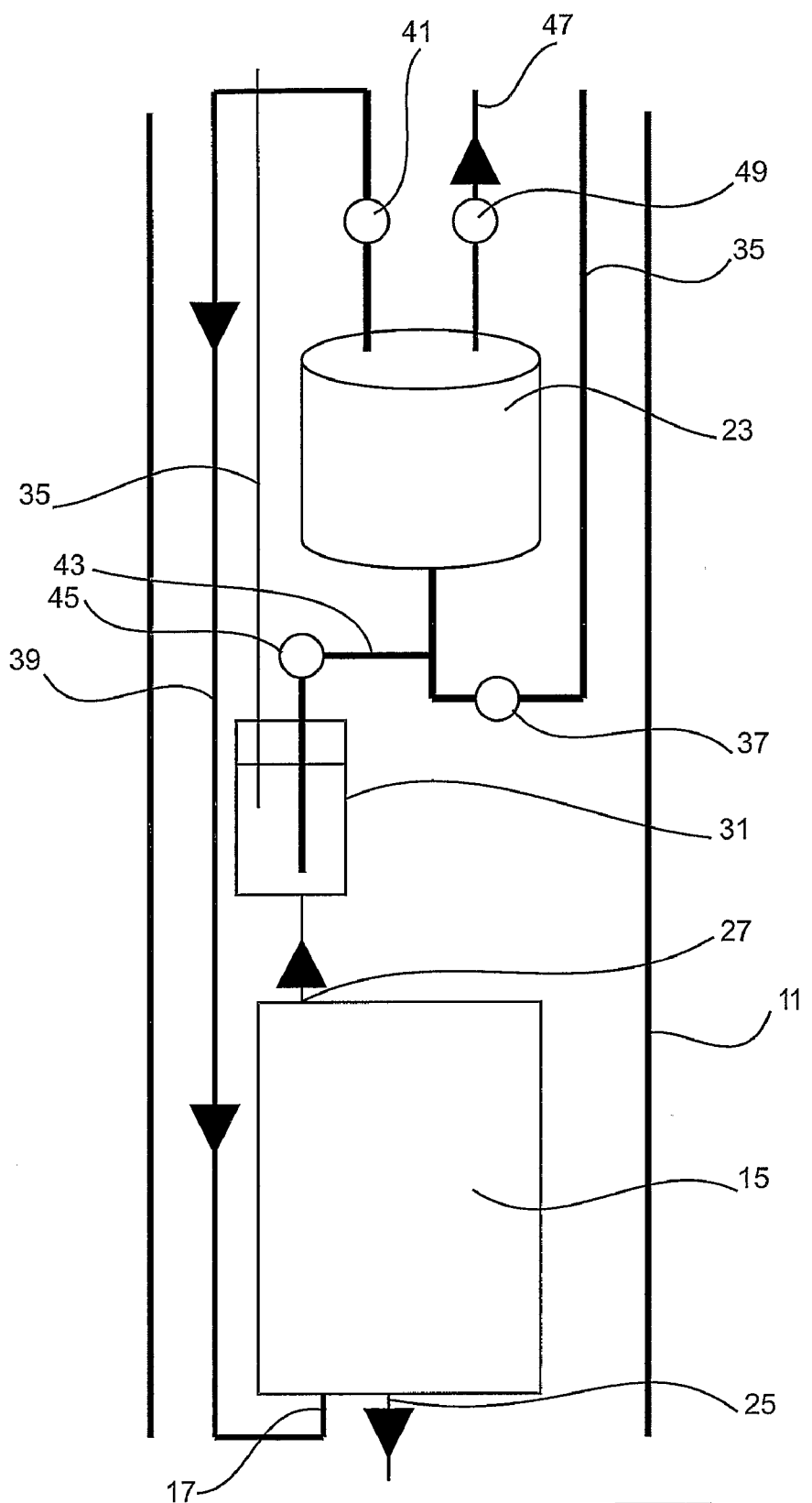
FIG. 4 is a schematic representation of the second embodiment of the invention.

A second embodiment is illustrated at FIG. 4 and applies to a circumstance where there is sufficient hydrostatic head in the bore hole to provide a significant pressure differential across the reverse osmosis medium of the reverse osmosis units with a minimal additional pumping of feed from the aquifer being required. This situation is likely to apply in the case of deeper, confined or semi-confined aquifers. In the case of the fourth embodiment the device utilises a single pump 23 which is able to deliver water contained within the bore hole to the inlet 17 of the reverse osmosis unit 15 and can also deliver the permeate from the reverse osmosis unit 15 to the surface. The pump 23 has an inlet which is open to the interior of the bore hole screen through a first inlet line 35 which is controlled by a first control valve 37 to be able to receive water contained within an upper portion of the bore hole and the pump is able to deliver this water to the inlet 17 of the reverse osmosis unit 15 through a first delivery line 39 via a second control valve 41. The permeate outlet 27 of the reverse osmosis unit 15 is connected to the storage reservoir 31 which will receive the permeate water and the permeate storage reservoir 31 is vented to atmosphere for pressure equalisation through duct 36. The reverse osmosis unit 15 also has a concentrate outlet 25 which delivers directly into the bore hole below the reverse osmosis unit and sealing packer. The pump 23 is also connected to the storage reservoir 31 through a second inlet line 43 and a third control valve 45 and has a permeate outlet connected to a permeate delivery line 47 through a fourth control valve 49. With the third and fourth control valves 45 and 49 closed and the first and second control valves 37 and 41 open the operation of the pump serves to deliver feed water from the bore hole through the first delivery conduit 37, to the second delivery conduit 39 and then to the reverse osmosis unit 15 at a pressure greater than the hydrostatic pressure at the lower most point of the concentrate outlet 25 of the apparatus. With the first and second valves 37 and 41 closed and the third and fourth control valves 45 and 49 open, the permeate in the storage reservoir can be delivered by the pump through the permeate delivery conduit 47 to the surface. During periods when permeate is being removed the pressure within the reverse osmosis unit would stabilise to a level substantially equal to the hydrostatic pressure at the concentrate outlet 25 which allows the reverse osmosis process to continue if that hydrostatic pressure is greater than that required for reverse osmosis to take place.

The third embodiment as shown at FIGS. 5A and 5B is also intended to be received in a bore hole. The unit according to the third embodiment is to be located in a length of bore hole casing 11 having two screened sections 13A and 13B spaced longitudinally to either side of an intermediate portion of the casing The unit also comprises an inflatable packer 51 which is to be located within the casing in the region of the intermediate portion such that the screened portions 13A and 13B are located to each side of the packer. The packer serves to support the unit within the casing and to isolate the portions of the interior of the borehole above and below the packer from each other. As in previous embodiments the unit comprises a pump 23 which is located above the packer 51 and which has an inlet which opens into the interior of the upper portion of the casing to receive the water flowing into the casing through the upper screen 13A. The outlet of the pump is connected to the inlet side 17 of the reverse osmosis unit 15 through the first delivery line 39. The reverse osmosis unit is located below the pump 23 with its inlet uppermost. The permeate outlet 27 of the reverse osmosis unit communicates with the other side of the reverse osmosis medium and is located at the upper end of the reverse osmosis unit 15. The permeate outlet is connected to a second delivery line 47 which extends upwardly through the casing to deliver the permeate to the surface. A one-way valve 53 is provided in the second delivery line to prevent the back flow of water in the line. The lower end of the reverse osmosis unit 15 is provided with the concentrate outlet 25 which opens into a third delivery line 55 which extends through and past the packer 51.

The unit according to the third embodiment is to be positioned in the borehole casing 11 which has 2 screened sections as described above. The upper screen 13A allows groundwater to enter the borehole casing when pumping starts. The lower screen 13B allows concentrate from the treatment process to be returned to the aquifer. The screens are separated by the intermediate portion of the casing, and during operation, the upper and lower screens are isolated by the inflatable packer 51. The bore annulus between the casing and the borehole and in the region of the intermediate portion is also sealed using a suitable medium such as bentonite to further isolate the influent groundwater and reinjected concentrate from the treatment plant.

The pump 23 is arranged on top of the reverse osmosis unit 15 and groundwater enters the borehole from the upper screened area 13A. The pump is installed within a pump housing which has an open end at its base. It could be possible to use a pre-filter on the pump housing if this is required. Water flows towards the pump intake through this orifice, and into the first delivery line 39 which is formed with a U-bend, and then into the reverse osmosis unit 15. At this stage the electrical conductivity of the feed water is monitored using a downhole probe (not shown). The flow rate can also be monitored at this point. The inlet pressure of the reverse osmosis unit is monitored at the surface through a pressure tube 56 which is connected into the top of the U-bend in the first delivery line to monitor feed pressure and if desired samples of feed water can also be taken at the surface using this tube.

The reverse osmosis unit comprises a pressure vessel 57 which contains four reverse osmosis elements through which the pumped groundwater passes on the feed side of the membrane, whilst less saline water permeates through the membrane and is collected on the permeate side of the membrane and thence into a central permeate tube 59 to which all four elements are connected. The permeate tube 59 is blocked off at its lower end, thus permeate accumulates in the tube and moves towards the surface through second delivery line 47 as water permeates through the membrane. If sufficient pressure is applied to the feed water by the pump 23 to overcome the design operating pressure plus additional pressure to lift permeate to the surface then the permeate will flow freely at the surface through second delivery line 47. If the pump cannot provide sufficient pressure, then a secondary pump within the permeate line 47 can be used to lift permeate to the surface.

The feed water becomes progressively more saline as water moves through the pressure vessel, and flexible seals 61 cause the concentrate to move sequentially from one element to the next through the vessel and finally to a the concentrate outlet 25 and the third delivery pipe 55 which takes the concentrate downwardly past the packer 51 to one of two exhaust valves 63 and 65 as shown in FIG. 5B, although the valves 63 and 65 can be located immediately below the pressure vessel 57 in the concentrate line 25, with valve 63 when open providing a means to bypass valve 65 (not shown). One exhaust valve 63 is a purge valve which is open when the system is first placed inside the borehole, and therefore allows water to freely enter the system if the pressure tube 56 on top of the U-bend is open to atmosphere at the surface to allow gas within the system to escape. The one exhaust valve 63 and pressure tube 56 are closed when the system is operating and producing permeate. If desired the one exhaust valve 63 can be opened during pumping to purge the pressure vessel of saline water and to remove precipitates as the water becomes more saline.

The other exhaust valve 65 valve is an adjustable valve which is set at a design working pressure specific for the reverse osmosis unit to maintain the pressure within the vessel and on the inlet side of the elements to drive the treatment process. The other valve is provided with a tail pipe 67 which extends downwardly from the valve. The exit pressure from the reverse osmosis unit needs to be less than the pressure produced by the pump 23 and therefore pressure at the other exhaust valve 65 needs to allow for hydrostatic head at the tail pipe 67 at the end of the third delivery line 55. The other exhaust valve 65 maintains pressure within the reverse osmosis unit and only allows passage of concentrate into the casing below the packer 51 when the set pressure is exceeded. The electrical conductivity of concentrate can be measured at this point as well as water pressure or pressure head of water and the flow rate of concentrate through the third delivery line 55.

The concentrate exits the second exhaust valve 63 and discharges back into the aquifer through the lower screened section 13B of the casing 11 which is physically isolated from the upper screen by the packer within the well, and by the seal within the bore annulus. It is anticipated that some concentrate may flow vertically upward and become part of the feed stream, however it is also anticipated that the combination of sealing packer, sealed annulus between each screen external to the casing, natural aquifer stratification giving significantly lower vertical hydraulic conductivity compared with lateral hydraulic conductivity, distance between the upper and lower screens, and higher density of the concentrate will combine to limit the extent of such concentrate return.

In the configuration described above the design pressures within the pressure vessel and outlet pressure at the second exhaust valve are defined by the operating pressures for the chosen reverse osmosis elements. Thus if relatively low permeate flows are required then low pressure elements operating at pressures of the order of 120-150 psig might suffice to provide 400-500 mls/sec of permeate of potable water quality from brackish groundwater up to total dissolved solids of 9000 mg/L.

The third embodiment as described above is intended to operate most efficiently when the pump and pressure vessel are located a few metres below standing groundwater level in the bore, such that the water level during pumping is always 2 m or more above the top of the pump. Although the hydrostatic pressure on the feed assists the reverse osmosis process somewhat, the system works most effectively if the water pressure of permeate within the permeate line is minimized (i.e. the pressure vessel is placed as high as possible within the borehole) during operation of the system. As indicated the head can be reduced by using a secondary pump, but this will increase the pumping costs.

In the application of the third embodiment the configuration of the feed flow, the reverse osmosis unit, the reverse osmosis elements, the packer position, the screen positions and concentrate outlet will be unique for each situation depending on aquifer properties (e.g. transmissivity) aquifer stratigraphy and layering, depth to groundwater, groundwater quality and aquifer depth. Each unit would be tailored to suit the local hydrogeology. A range of different reverse osmosis elements could be used to suit local requirements of permeate flow rate and desired water quality.

A further embodiment of the invention comprises a variation of the previous embodiment and is intended to be used in an existing borehole having a screen already present in the casing. I such an instance the packer can be used to separate the existing screen into an upper and lower portion by sealingly engaging with the internal face of the screen intermediate its length. Alternatively the packer can close off the lower portion of the screen and the tail pipe extend downwardly beyond the upper portion an adequate distance to enable the desired separation of the concentrate effluent form the feed water.

The reverse osmosis units of each of the above embodiments can take the form of any conventional reverse osmosis unit which can be modified and configured to be receivable within a bore hole. One form of reverse osmosis unit comprises cells in the form of a spiral wound element formed by a strip wound around a central cylindrical element where the strip is a composite element formed from sheets of reverse osmosis membrane to either side of a central water porous sheet with porous spacers provided along each external surface of the composite sheet. Feed water is delivered into the space surrounding the external faces of the composite sheet whilst the permeate is extracted from the porous sheet located between the two sheets of reverse osmosis membrane.

Alternatively hollow-fibre reverse osmosis cells could be configured for use with the embodiments. Conventionally these incorporate small diameter, hollow reverse osmosis membranes with internal, porous support medium in a high pressure vessel into which the feed solution is delivered where the permeate is collected from the interior of the hollow fibres.

Conventionally reverse osmosis reverse osmosis media can lose their permeability due to fouling from particulates, from filtering of colloidal sized particles, from precipitation of mineral scales as salts concentrate around the reverse osmosis medium, and from bacterial fouling. Therefore each reverse osmosis application has to take these aspects into account and feed water pre-treatment may be necessary with in situ reverse osmosis treatment according to each of the embodiments.

As the solutes concentrate in the aqueous solution during the reverse osmosis process, mineral species can become saturated or supersaturated and as a result precipitate out to form scales. In this regard carbonate minerals (calcite, aragonite, siderite) and sulphate minerals such as gypsum $[CaSO_4.2H_2O]$, anhydrite $[CaSO_4]$, barite $[BaSO_4]$ and celestite $[SrSO_4]$, fluorite $[CaF_2]$ and silica are typical, common minerals known to form scales. To avoid this problem antiscalants can be added to the feed to counteract scale formation. Thus acids can be added to feed water to reduce carbonate ion concentration and form bicarbonate ions and carbonic acid and thus reduce saturation with respect to carbonate minerals. Other antiscalants are used and serve to inhibit the formation of precipitates so that small crystal nuclei can be removed from the reverse osmosis medium in feed flow. It is anticipated that it will be possible to add antiscalants to the feed water in the case of each of the embodiments, so these problems are likely to give rise to no greater problems than is the case with conventional systems. However It is also possible that systems according to the embodiments devices may be operated at low pressures with lower overall concentrations in reject solutions, which will result in a reduced likelihood of scale formation.

In addition prefiltration is nearly always recommended to protect reverse osmosis mediums with a minimum filter pore size of 5 microns from clogging. This would probably be required for each of the embodiments but it is anticipated that conventional sand/gravel packs which are used in properly constructed wells may provide adequate filtration. However while this level of filtration would remove suspended solids it will not remove the "turbidity" typical of colloidal sized suspended solids. Such colloids form, for example, when reduced and more soluble ferrous and manganous ions in groundwater are oxidized on exposure to atmospheric oxygen to their less soluble forms. The resultant precipitated oxyhydroxide minerals form colloidal suspensions and hence give rise to turbidity in the groundwater. High rates of pumping can also mobilize colloidal sized clay particles in the aquifer, giving rise to turbidity.

It is anticipated that in the case of the embodiments where low flow rates are used in feed to the reverse osmosis units, and where there is no direct contact of the downhole reverse osmosis system with the atmosphere that there will be, reasonable protection from water turbidity and the formation of colloidal suspensions compared with more conventional reverse osmosis systems, since in the case of each of the precautions referred to above it is a characteristic of each of the embodiments that the water to be desalinated is treated in situ. This compares to other prior art proposals in which water is removed from its environment to be treated. A problem that such a situation creates is that once the water is removed from its environment (e.g. an underground aquifer) the dissolved materials in the water will be exposed to the atmosphere and can react (i.e. either as a result of oxidation processes) to produce precipitates or colloidal suspensions or further affect the characteristics of the water which then must be dealt with before the water can be subjected to reverse osmosis. Therefore, if the well construction is good, particularly relating to the sand/gravel pack around the well screen then larger suspended particle sizes would seem less likely to have an impact on the reverse osmosis reverse osmosis medium, and relatively coarse filtration may be the only treatment necessary.

In addition in treating the water in situ the problems created by bacteria are reduced. While natural bacteria are endemic in groundwater systems, in deeper aquifers which have low dissolved carbon, low nutrient and often anoxic conditions, the resultant low energy conditions mean that bacteria numbers are low, and bacterial activity is very subdued compared to that in soils and in shallow aquifers. Deeper groundwaters also tend not to be contaminated by pathogenic bacteria and viruses which are more common in shallow groundwaters, eg from sewage contamination. Bacteria can cause problems in groundwater supply wells, particularly from iron oxidizing bacteria which form iron scales within the well screen and gravel pack, leading to well clogging. These bacteria are aerobic, requiring a ready supply of dissolved oxygen which is derived from aeration of groundwater during rapid drawdown and recovery of water levels in and immediately around the supply well during pumping and pump shutdown. The problem is much less prevalent in deeper, semi-confined aquifers, where oxygen ingress is less likely. Low-flow pumping, as proposed in the case of the embodiments would also preclude oxygen ingress. Therefore it is anticipated that in the case of each of the embodiments that because the process is conducted in situ the reverse osmosis treatment is unlikely to be significantly impacted by bacterial activity, particularly from production of bacterial slimes which could clog reverse osmosis reverse osmosis mediums.

In comparison with conventional reverse osmosis desalination plants it is envisaged that the plant according to the invention will be more economically viable when compared with other sources of potable water. The plant according to the embodiments would not require a number of the capital items which are required of conventional reverse osmosis installations, since most of the infrastructure is below ground and there is no requirement for extensive building structures or for water storage which is provided naturally by the aquifer. It is assumed that costs of the downhole reverse osmosis system itself would be similar to those for a conventional above ground application and the cost for the provision of "feed water" (i.e. drilling of wells to obtain brackish groundwater) would be the same in both cases. However there would be no requirement for high volume pumping as is the case with conventional reverse osmosis systems, and there is no requirement for high-pressure pumping, except for the recovery of permeate. Furthermore because the embodiments are accommodated within the bore hole they are limited in their output to the capacity of the borehole. While this may be perceived as being a difficulty it is in fact a significant advantage in that the impact upon the environment is limited and where water is being processed by a number of units each at different boreholes at a site the impact of the extraction of desalinated water from the site and the depositing of concentrate effluent into the aquifer is distributed over a wide area which is able to be more readily accommodated by an aquifer. Taking these factors into account, the reduced construction costs and reduced environmental impact for a desalination plant according to the embodiments could be quite considerable when compared to a conventional desalination plant utilising a conventional reverse osmosis system.

It is also anticipated that operational costs will be less with electric power requirements likely being less since the reject disposal costs are anticipated to be negligible.

Disposal of reject solutions in conventional reverse osmosis applications is often problematic, and with any such in situ treatment system such as in the embodiments described here where reject is disposed back into the reservoir from which the feed came, the impact of this disposal method would need to be assessed and approved by regulatory agencies and jurisdictions. In particular, the beneficial use or environmental value of the reservoir or aquifer resource should not be unduly affected by such disposal of reject solution. Given the likelihood that brackish or saline aquifers would have no value for drinking water for humans or animals, or for irrigation purposes, then the main consideration would be environmental water use in relation to the aquifer ecosystem itself, or discharge of groundwater to surface ecosystems. In cases where surface discharges are absent or where there is discharge to a terminal drainage system such as the ocean or a salt lake, then impacts are likely negligible.

Thus the desalination plant according to the invention offers reduced overall capital and operational costs, as well as low visual impact of minimal above-ground infrastructure, whilst also avoiding problems from disposal of reject solutions at the surface. Overall, the system potentially should offer equivalent performance at lower overall capital, operational and environmental costs.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiment described above. In particular whilst the embodiments are each directed to down hole installations the invention need not be so limited and can have application to above ground installations.

The invention claimed is:

1. An in situ desalination apparatus adapted for use located in a borehole containing groundwater from a subterranean aquifer and provided with a casing for the borehole, the casing comprising a wall at least a portion of which is screened allowing water to flow therethrough, the desalination apparatus comprising:
   a sealing means for sealing against the borehole casing to separate the borehole into upper and lower portions the casing allowing flow of ground water through the screen into at least the upper portion;
   a reverse osmosis unit comprising a reverse osmosis medium;
   an inlet for the reverse osmosis unit located on one side of the reverse osmosis medium, in use the inlet to be located below the upper surface of the groundwater and in the upper portion of the borehole with respect to the sealing means;
   a concentrate outlet for the reverse osmosis unit opening to the one side of said reverse osmosis medium as the inlet, for delivering concentrate to the lower portion of the borehole with respect to the sealing means;
   a permeate outlet on the other side of the reverse osmosis medium from said inlet;
   a delivery line in fluid communication with the permeate outlet in use extending from the body of water; and
   a pump for delivering groundwater to the inlet; and wherein the sealing means is adapted to allow the apparatus including the sealing means to be removably inserted into the borehole casing, wherein the sealing means is a packer adapted to allow the apparatus to be removably inserted into the borehole casing.

2. An in situ desalination apparatus according to claim 1 wherein the sealing means is expandable from a state receivable within the casing to an expanded state sealed against the casing.

3. An in situ desalination apparatus according to claim 2 wherein the sealing means comprises an inflatable packer which can be selectively inflated to seal against the casing.

4. An in situ desalination apparatus according to claim 1 wherein the sealing means seals against the casing to separate the borehole into an upper part wherein the casing comprises a screened wall portion for admitting water from the aquifer and a lower part wherein the casing comprises a screened wall portion to allow the saline concentrate to dissipate within the aquifer.

5. An in situ desalination apparatus according to claim 4 wherein the casing comprises two screened portions axially spaced along the length of the casing.

6. An in situ desalination apparatus according to claim 1 wherein the permeate outlet is associated with a pumping means adapted to extract permeate passing through the reverse osmosis medium.

7. An in situ desalination apparatus according to claim 1 wherein the permeate outlet is vented to the atmosphere.

8. An in situ desalination apparatus according to claim 1 wherein the pump is a common pump connected to the inlet and the permeate outlet through a set of valves whereby said common pump is able to introduce said water into the inlet and deliver permeate from the permeate outlet through a controlled activation of the valves.

9. An in situ desalination apparatus comprising
   a length of tubular borehole casing adapted in use to be located in a borehole the casing comprising at least a portion of screened wall for allowing the passage of water through the casing;
   a sealing means for sealing against the borehole casing and dividing the borehole within the casing into an upper portion and a lower portion, the sealing means and borehole casing cooperating to allow flow of ground water through a screened portion into at least the upper portion;
   a reverse osmosis unit supported within the bore hole by the sealing means the reverse osmosis unit having a reverse osmosis medium;
   an inlet for the reverse osmosis unit providing communication between the upper portion of the interior of the casing and one side of the reverse osmosis medium;
   a concentrate outlet for the reverse osmosis unit providing communication between the one side of the reverse osmosis medium and the lower portion of the borehole, wherein the concentrate outlet is controlled by an exhaust valve which is closed upon the pressure at the one side of the reverse osmosis medium falling below a pressure of determined magnitude which is at least equal to the desired operating pressure of the reverse osmosis unit;

a permeate outlet for the reverse osmosis unit opening on the other side of the reverse osmosis medium;

a delivery line in communication with the permeate outlet extending from the body of water; and a pump for delivering water under pressure from the upper portion of the interior of the casing to the inlet, whereby the pressure differential created across the reverse osmosis medium facilitates reverse osmosis and wherein the tubular borehole casing includes a portion of screened wall in the upper portion of the casing with respect to the sealing means and a screened portion in the lower part with respect to the sealing means, wherein the sealing means is a packer adapted to allow the apparatus to be removably inserted into the borehole casing.

10. An in situ desalination apparatus according to claim 9 wherein the screened wall is continuous.

11. An in situ desalination apparatus according to claim 9 wherein there are at least two portions of screened wall at axially spaced locations along the length of the casing.

12. An in situ desalination apparatus according to claim 9 further comprising a groundwater delivery pump for providing a flow of groundwater through a screened portion into an upper portion of the borehole in the casing.

13. An in situ desalination apparatus according to claim 9 wherein the sealing means is expandable from a state receivable within the casing to an expanded state sealed against of the casing.

14. An in situ desalination apparatus as claimed at claim 9 wherein the permeate outlet is associated with a pumping means adapted to extract permeate passing through the reverse osmosis medium.

15. An in situ desalination apparatus as claimed at claim 14 wherein the permeate outlet is vented to the atmosphere.

16. An in situ desalination apparatus according to claim 9 wherein the concentrate outlet is controlled to maintain pressure of predetermined magnitude sufficient for reverse osmosis.

17. An in situ desalination apparatus according to claim 9 wherein the sealing means comprises an inflatable packer which can be selectively inflated to provide the sealing against the casing.

18. An in situ desalination apparatus according to claim 9 wherein the reverse osmosis medium, pump and sealing means together comprise a unit which is removable from the casing.

19. An in situ desalination apparatus according to claim 9 wherein the casing comprises two screened portions at axially spaced locations along the length of the casing and the sealing means in use engages the inner face of the casing between the two screened portions such that the upper portion communicates with the upper most screen and is sealed from the lower screen.

20. An in situ desalination apparatus according to claim 9 comprising a borehole in an aquifer comprising a water table, a borehole casing lining the borehole, an assembly comprising the reverse osmosis unit, the pump and the sealing means adapted to be removably inserted in the borehole casing and retained therein by radial expansion of the sealing means.

\* \* \* \* \*